United States Patent [19]

Lenney

[11] Patent Number: 4,694,056
[45] Date of Patent: Sep. 15, 1987

[54] PRESSURE SENSITIVE ADHESIVES PREPARED BY POLYMERIZATION IN THE PRESENCE OF ETHOXYLATED ACETYLENIC TERTIARY GLYCOL

[75] Inventor: William E. Lenney, Middlesex, N.J.

[73] Assignee: Air Products and Chemicals, Inc., Allentown, Pa.

[21] Appl. No.: 408,363

[22] Filed: Aug. 16, 1982

[51] Int. Cl.⁴ ............................................. C08F 2/30
[52] U.S. Cl. .................................. 526/202; 526/210; 526/211; 526/263; 526/318.4
[58] Field of Search ............... 526/210, 202, 211, 263, 526/318.4

[56] References Cited

U.S. PATENT DOCUMENTS

| | | | |
|---|---|---|---|
| Re. 24,906 | 12/1960 | Ulrich | 206/59 |
| 2,931,836 | 4/1960 | Cameron | 526/285 |
| 3,257,478 | 6/1966 | Jubilee, Jr. et al. | 260/901 |
| 3,268,593 | 8/1966 | Carpenter et al. | 260/615 |
| 3,293,191 | 12/1966 | Carpenter et al. | 252/351 |
| 3,654,213 | 4/1972 | Christenson et al. | 260/33.6 |
| 3,661,696 | 5/1972 | Knutson | 161/204 |
| 3,697,618 | 10/1972 | Grunewalder et al. | 260/78.5 R |
| 3,890,292 | 6/1975 | Bohme et al. | 260/80.76 |
| 3,971,766 | 7/1976 | Ono et al. | 526/317 |
| 3,998,997 | 12/1976 | Mowdood et al. | 526/271 |
| 4,185,050 | 1/1980 | Lazear et al. | 525/221 |

*Primary Examiner*—Peter F. Kulkosky
*Attorney, Agent, or Firm*—Russell L. Brewer; James C. Simmons; E. Eugene Innis

[57] ABSTRACT

This invention relates to an improved pressure sensitive adhesive comprising a polymer system which has excellent tack, peel and shear adhesion strengths. The improvement resides in the polymer, with the polymer system being formed by emulsion polymerizing an unsaturated ester, an unsaturated carboxylic acid and a polyfunctional monomer in the presence of a stabilizer system comprising an ethoxylated acetylenic tertiary glycol and polyvinyl alcohol.

5 Claims, No Drawings

PRESSURE SENSITIVE ADHESIVES PREPARED BY POLYMERIZATION IN THE PRESENCE OF ETHOXYLATED ACETYLENIC TERTIARY GLYCOL

DESCRIPTION OF THE PRIOR ART

Aqueous or solvent based pressure sensitive adhesives are well-known and have found application in a variety of areas such as, for example, in the manufacture of tapes and labels. Good pressure sensitive adhesives have immediate adhesion to a surface which property is often referred to as "quick tack". They also require good resistance to failure when subjected to shearing forces after application. This property is referred to as "shear adhesion". They must also have excellent bond strength, which is referred to as "peel". In the past commercial adhesives have generally comprised an acrylate ester or vinyl ester based polymer system with various amounts of other monomers, e.g., polyfunctional or adhesion promoting added to give desired properties.

Recent developments in the disposible diaper field have created a demand for pressure sensitive adhesive tapes, but many pressure sensitive adhesives are not suited for this use because the adhesives cannot tolerate the shear forces associated with that application. Although attempts have been made to enhance the shear strength of the polymer system, the quick tack and peel values of the resulting adhesion generally diminish with the increase in shear strength.

Another commercial area requiring exceptional pressure sensitive adhesives is in the permanent label field. These labels must adhere well and retain their bond formation. High shear resistance is required since these labels quite often are exposed to high shear forces.

The following patents disclose a variety of pressure sensitive adhesives which are considered to be acrylic ester of vinyl ester or acetate-based systems. Representative patents include:

U.S. Pat. No. 3,971,766 discloses a pressure sensitive adhesive containing a copolymer of an alkyl acrylate with 2-6 mol percent acrylic or methacrylic acid and 0.002 to 0.05 mol percent of a polyfunctional unsaturated monomer, e.g. diallyl phthalate or polyethylene glycol dimethacrylate for imparting internal cohesive strength.

U.S. Pat. No. RE. 24,906 discloses an acrylic-based pressure sensitive adhesive formed by polymerizing a non-tertiary acrylate ester with a copolymerizable monomer having strongly polar groups such as acrylic or methacrylic acid. Typical esters employed are isoamyl acrylate, 2-ethyl butyl acrylate and 2-ethyl hexyl acrylate. The polymers are produced by emulsion polymerizing using an alkylated aryl polyether sodium sulphate as the surfactant.

U.S. Pat. No. 4,185,050 discloses a pressure sensitive adhesive comprising a terpolymer of an alkyl acrylate, a vinyl ester, an ethylenically unsaturated carboxylic acid. The pressure sensitive adhesive comprises a blend of a plurality of terpolymers formed from the above monomers with each terpolymer having a specific molecular weight range.

U.S. Pat. No. 3,998,997 discloses pressure sensitive adhesives of interpolymers of acrylates and acrylic acid using a di, tri, or tetrafunctional vinyl cross-linking agent to enhance the cohesive strength of the polymer. The pressure sensitive adhesives are formed by emulsion polymerization and anionic, cationic, nonionic or amphoteric-type emulsifiers and surfactants are suggested as being effective stabilizers for the polymerization medium.

U.S. Pat. No. 3,697,618 discloses an acrylic pressure sensitive adhesive consisting of a vinyl ester of a saturated monocarboxylic acid, e.g. vinyl acetate, and alkyl acrylate, e.g., one having from 4-14 carbon atoms such as 2-ethyl hexyl acrylate or dodecyl acrylate and an alpha, beta-ethylenically unsaturated dicarboxylic acid with the vinyl acetate being present in a proportion of from 20-60 weight percent, at least 35% alkyl acrylate and from about 0.3 to 5% acid.

U.S. Pat. No. 3,890,292 discloses a water dispersible pressure sensitive adhesive comprising an alkyl acrylate, an alpha, beta-unsaturated carboxylic acid such as acrylic or methacrylic acid, a vinyl ester, e.g. vinyl acetate (10-40% by weight) and a plasticizer such as dibutyl phthalate.

U.S. Pat. No. 3,654,213 discloses a pressure sensitive adhesive comprising a polymer base of 2-ethyl hexyl acrylate, vinyl acetate, acrylic acid and a mixed vinyl ester of an alkanoic acid-containing 10-12 carbon atoms.

U.S. Pat. No. 3,257,478 discloses pressure sensitive adhesives comprising vinyl acetate, octyl acrylate, ethyl acrylate and maleic anhydride. In addition, crosslinkable monomers such as N-methylolacrylamide are included.

SUMMARY OF THE INVENTION

This invention relates to an improvement in an pressure sensitive adhesive having excellent peel, quick tack and shear adhesion strength. The pressure sensitive adhesive is an improvement in a basic polymer system for pressure sensitive adhesives comprising a copolymer of an alkyl acrylate or vinyl ester or both, an acid functional comonomer, and a polyfunctional copolymerizable monomer. The improvement in the polymer system resides in forming the polymer system by emulsion polymerization techniques and carrying out the emulsion polymerization in the presence of a stabilizer system comprising an ethoxylated acetylenic glycol represented by the formula:

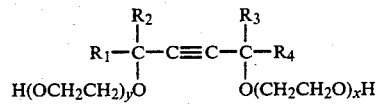

where $R_1+R_4$ are alkyl radicals containing from 3-10 carbon atoms, $R_2+R_3$ are selected from the group consisting of methyl and ethyl, and x and y have a sum in the range of 3-60 inclusive and a partially acetylated polyvinyl alcohol.

Advantages of the pressure sensitive adhesives of this invention are:
  they have extremely high shear strength without any substantial sacrifice in peel or quick tack strength associated with the adhesive;
  they can be water-based and designed for easy and efficient application;
  they have good quick tack and peel strength and are better than or compare favorably to commercially available pressure sensitive adhesive systems.

DESCRIPTION OF THE PREFERRED EMBODIMENTS

There are many properties necessary for the commercialization of a pressure sensitive adhesive, but three qualities which all pressure sensitive adhesives require are high bond strength, which is determined at two intervals; (1) initially when first applied to a surface, and (2) after cure or bond formation and high shear strength. These two properties of bond strength are referred to as "quick tack" and "peel" strength, both of which have to be high, e.g. 4 lbs./linear inch in order to be effective as a pressure sensitive adhesive for tapes, particularly in the disposable diaper tape field and for permanent labels. A third quality of a commercial adhesive is that it must have excellent cohesive strength such that when a shear force is applied, it will retain its integrity. Commercial pressure sensitive adhesive should have a shear resistance of above 3,000 minutes, and preferably above 6,000 minutes when measured with a 500 gram weight and ½ inch by ½ inch contact. Many of the conventional acrylate polymer systems contain soft polymer segments, and although these systems exhibit good quick tack and peel strength, they often have extremely poor shear strength or shear resistance. Vinyl acetate often has been incorporated into the polymer system to enhance the cohesive strength of the polymer, but still the shear strength of the polymer was too low for some applications. Cross-linking monomers, e.g., diallyl phthalate were also added to aid shear resistance.

The present polymer system is an improvement over the conventional pressure sensitive adhesive systems with the improvement relating to increasing the shear strength of the polymer system without substantially affecting the other properties, e.g. tack and peel. The polymer in the present system is formed by emulsion polymerization techniques and resides in the utilization of a stabilizer system comprising an ethoxylated acetylenic glycol and a partially acetylated polyvinyl alcohol. It has been found that the ethoxylated acetylenic tertiary glycol, particularly when coupled with polyvinyl alcohol as a protective colloid, substantially increases the shear strength or shear resistance of the resulting polymer as compared to the same polymer system prepared with conventional stabilizers including polyvinyl alcohol alone or in combination with nonionic surfactants.

The ethylene oxide adducts of acetylenic tertiary glycols used in the practice of the invention are structurally represented by the formula:

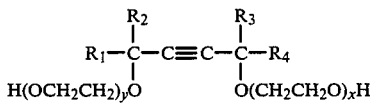

in which $R_1$ and $R_8$ are alkyl radicals containing from 3-10 carbon atoms, and $R_2$ and $R_3$ are selected from the group consisting of methyl and ethyl, and x and y have a sum in the range of 3-60, inclusive. In the preferred case, $R_1$ and $R_4$ are alkyl radicals having 3-4 carbon atoms each and $R_2$ and $R_3$ are methyl groups. Further examples and synthesis techniques for the manufacture of these adducts are shown in U.S. Pat. Nos. 3,268,593, and 3,293,191 which are incorporated by reference.

Ethoxylated tertiary acetylenic glycols for emulsion polymerization are generally used as a mixture or combination comprising a highly ethoxylated system (30 mols) and one of lesser ethoxylatation, e.g. (10 mols). Often as is known the lesser ethoxylated system will precipitate out at polymerization temperatures, e.g. 70° C., and thus it is coupled with a higher ethoxylated form since that form is thermally stable at reaction temperature. However, as is known the higher ethyoxylated form has lower wettability than the lesser ethoxylated form and therefore a balance between the tertiary acetylenic glycols is selected to accomodate the reaction medium.

The other component of the stabilizer system is a partially hydrolyzed polyvinyl alcohol. Its function as is known in emulsion polymerization is that of a protective colloid. Usually the degree of hydrolysis of the polyvinyl alcohol when used as protective colloid is from 80-90%.

In the emulsion polymerization process, the ethylene oxide adduct of the acetylenic tertiary glycol is included in a proportion sufficient to enhance the shear adhesion or shear resistance of the resulting copolymer. Typically, this proportion is from about 1 to 4% by weight of the monomers, and preferably is from about 2 to 3%. When the concentration of the ethylene oxide adducts of acetylenic glycol falls below about 1% by weight of the monomers there is generally insufficient surfactant to substantially increase the shear resistance. When the concentration exceeds about 4%, no significant advantages are achieved or believed to be observed in terms of overall properties of the pressure sensitive adhesive. It may be that shear rate resistance increases, but there could also be a decrease in peel strength.

The polyvinyl alcohol is included in the stabilizer system in a proportion of about 1-4% by weight of the monomers. Polyvinyl alcohol tends to result in a polymer having higher insolubles than polymers produced without it. To produce the % insoluble range desired in the adhesive, i.e. 45-65% by weight in toluene, the polyvinyl alcohol is included in a proportion of about 1.5-3.5% by weight of the monomers with the ethoxylated acetylene glycol comprising 1.5-3.5% by weight of the monomers.

The polymer in the pressure sensitive adhesive comprises any acrylate or vinyl ester monomer or both used in pressure sensitive adhesives. Types of esters commonly used are the $C_{2-6}$ alkyl esters of acrylic and methacrylic acid. Other types include the vinyl esters where the ester has from 1-4 carbon atoms. Representative examples of alkyl esters of acrylic and methacrylic acid are butyl acrylate, amyl acrylate, hexyl acrylate, decyl acrylate, 2-ethylhexyl acrylate, nonyl acrylate, etc. Representative vinyl esters include vinyl acetate, vinyl propionate and vinyl butyrate.

Combinations of monomers are selected so the polymer will have a "softness" to it at room temperature, which is manifested in a polymer Tg (glass transition temperature) of $-10°$ C. or below. Typically the Tg is about $-20°$ to $-35°$ C. in these polymer systems. Thus when a hard polymer forming monomer is included in the system it may be necessary to alter its effect somewhat by including a softer polymer forming monomer or to increase the amount of soft polymer forming monomer. For example if high proportion of vinyl acetate is used, which results in a tough polymer having reduced peel, it may be necessary to go to a higher molecular weight acrylate ester or diester in order to soften the polymer to the desired level.

Diesters can also be substituted for the alkyl acrylate esters in the practice of this invention, and these esters are generally $C_{4-14}$, preferably $C_{8-12}$ diesters of alpha, beta-ethylenically unsaturated dicarboxylic acids. These esters are included for purposes of imparting quick tack to the adhesive and these diesters include dihexyl maleate, dihexyl fumarate, dioctyl maleate, dibutyl maleate, dioctyl fumarate, etc. In view of the fact these monomers are included in the copolymer for purposes imparting quick tack, they can be used in addition to or as a replacement for the alkyl acrylate. Although vinyl acetate can be substituted for the alkyl acrylate or the ester of an unsaturated dicarboxylic acid, it is preferred that the pressure sensitive adhesive contain a substantial amount of alkyl acrylate or diester of the unsaturated dicarboxylic acid, or both in order to provide the good quick tack and peel properties. Either of these esters then are combined with vinyl acetate to produce a polymer having the desired Tg range and softness for quick tack and peel. Dioctyl maleate has been found to be a particularly effective diester for use with vinyl acetate in preparing the pressure sensitive adhesive.

The vinyl ester, acrylate ester, or diester combination is incorporated into the polymer system in an amount of from 96.6 to 99.4% and the balance comprises other monomers including polyfunctional unsaturated and adhesion promoting monomers. In most cases the polymer will comprise from about 25.9 to 50.3% vinyl acetate and from about 49.1 to 71.7% acrylate or diester. Since high levels of vinyl acetate in the polymer reduce peel and quick tack, it is preferable to use less vinyl acetate and enhance the cohesive strength of the polymer through the addition of greater amounts of polyfunctional copolymerizable monomer, polyvinyl alcohol or ethoxylated acetylenic glycol, or all of the above.

A polyfunctional monomer is incorporated into the polymer system to enhance the internal cohesive strength of the pressure sensitive adhesive. This type of monomer internally crosslinks the polymer system as it is formed as opposed to crosslinking the polymer system after synthesis, as in a post-cure system. The preferred polyfunctional unsaturated monomers are polyvinyl or polyallylic monomers. These monomers can be di, tri or tetrafunctional unsaturated systems, and include divinyl benzene, divinyl adipate, diallyl phthalate, diallyl maleate, diallyl fumarate, triallyl cyanurate, and the like. These polyfunctional monomers are used in a small proportion, generally from about 0.1 to 0.4% by weight of the polymer system. When more than 0.4% by weight of the polyfunctional monomer is used, as for example with a triallylic monomer, the cohesive strength of the polymer may be increased but often the peel strength is reduced. Higher levels of monomer may be required with the diunsaturated system than with the tri or tetrafunctional system in order to achieve cohesive strength.

A fourth component used in the manufacture of the pressure sensitive adhesive is an adhesion promoting unsaturated polycarboxylic acid. The carboxylic acids conventionally used the manufacture of pressure sensitive adhesives and used in this invention include from about 3–6 carbon atoms and are aliphatic in nature. Examples of unsaturated acids suited for the polymer system are those of the acrylic acid series such as acrylic and methacrylic acid; crotonic acid, maleic acid, and the like. For reasons of convenience, acrylic is the preferred. The acid functionality is included in an adhesion promoting amount of from about 0.5 to 3.0% by weight of the polymer system. The combination of carboxyl containing monomer plus polyfunctional unsaturated monomer enhances shear resistance with the acid functionality having a tendency to enhance peel strength and quick tack in addition to enhancing shear resistance.

Monomers within the four classes of polymer system for pressure sensitive adhesive application are well known as illustrated in the prior art. Accordingly, polymer based systems described in the patents of the prior art application section of this application are incorporated by reference.

The polymers which are best suited for pressure sensitive adhesive application using preferred monomers have an "insolubles" (measured in toluene at reflux temperature and atmospheric pressure) of from about 45–65% by weight. The insolubles of the polymer can be controlled within this range by varying the ratio of polyfunctional unsaturated monomer vis-a-vis the unsaturated acid and by controlling the level of stabilizer and ratio of components in the stabilizer system. For example employing a high level of the polyvinyl alcohol content or polyfunctional unsaturated monomer will tend to increase the insolubles content of the polymer as compared to polymers produced with a low level of polyvinyl alcohol or polyfunctional unsaturated monomer. Polymers having low insolubles, e.g. less than about 45% tend to have reduced shear adhesion.

A preferred polymer base for the pressure sensitive adhesive generally comprises by weight:
  unsaturated diester, e.g. dioctyl maleate 56.6–65%
  vinyl acetate 34.4–40%
  polyfunctional allylic unsaturated monomer 0.1 to 0.4%, particularly triallyl cyanurate; and
  unsaturated carboxylic acid, e.g. acrylic acid 0.5 to 3.0 by weight.

The stabilizer system comprises 1–4% of the ethoxylated adduct of the tertiary acetylenic glycol and 1–4% polyvinyl alcohol based upon the weight of the monomers.

The copolymers constituting the base of the aqueous pressure sensitive adhesive dispersions of this invention are formed by conventional emulsion polymerization techniques. In this polymerization, a recipe is formed which generally consists of water, stabilizers, buffers, and monomers and then polymerized at conventional temperatures. Temperatures for the polymerization of esters of the type described range from about 20°–80° C. In view of the difference in polymerization rate of many of the various monomers, it may be preferable to delay (continuously or incrementally add) the addition of those monomers having a fast polymerization rate into the polymerization medium. For example, the acrylic monomers have a reaction site much faster than vinyl acetate and often are delayed to the system during polymerization.

The following examples are provided to illustrate embodiments of the invention and are not intended to restrict the scope thereof. All parts are listed by weight, and all percentages are expressed as weight percentages unless expressed otherwise.

EXAMPLE 1

An aqueous pressure sensitive adhesive formulation was prepared by purging a one gallon stainless steel reactor with nitrogen. Then, the reactor was initially charged with a mixture comprising:

| | Weight Parts |
|---|---|
| 1. A 10% aqueous solution containing a partially hydrolyzed (87–89%) polyvinyl alcohol, the solution having a viscosity of from 4–6 cps | 492.7 |
| 2. Deionized water | 664 |
| *3. Ethylene oxide adduct of 2, 4, 7, 9,-tetramethyl decyne diol containing an average of 30 mols ethylene oxide per mole of surface active agent and having a cloud point of about 100° C. | 11.4 |
| **4. Ethylene oxide adduct of 2, 4, 7, 9-tetramethyl decyne diol containing an average of 10 moles ethylene oxide per mole of surface active agent | 23.9 |
| 5. Ferric sulfate .7 H$_2$O as a 0.1% aqueous solution | 11.4 |
| 6. Vinyl acetate | 303 |
| 7. Dioctyl maleate | 518 |

*A product sold under the registered trademark Surfynol 485.
**A product sold under the registered trademark Surfynol 465.

After the reactor was initially charged with components 1–7, 28.5 parts of a 10% solution of t-butyl hydroperoxide was pumped into the vessel; the vessel was then sealed and pressured to 50 psig with nitrogen. The agitator, which was a turbine blade agitator, was set at a rotation rate of about 800 rpm. The temperature was raised to 55° C. After the temperature had reached steady state, a 4.4% aqueous solution of sodium formaldehyde sulfoxylate buffered with sodium acetate was introduced into the reactor at a rate of about 1.5 ml./min. and polymerization was initiated at this time. Once the polymerization had been initiated, the rate of addition of sodium formaldehyde sulfoxylated was decreased to about 1.1 to 1.2 ml./min. for a period of about 215 minutes. Then, a delay feed monomer composition was introduced at a rate of about 7.3 ml./min. The delay feed monomer composition comprised 294.8 parts vinyl acetate, 509.8 parts dioctyl maleate, 16.4 parts acrylic acid, and 3.94 parts triallyl cyanurate. It comprised about 880 mls and was added over a period of about 120 minutes. To maintain the reaction 115 ml. of 10% t-butyl hydroperoxide catalyst were added over a period of 215 minutes.

The reaction proceeded in conventional emulsion polymerization manner with the process temperature being maintained at 55° C. by jacket temperature control. After about three hours, the reaction exotherm decreased indicating the polymerization was about complete at which time a small amount (4.8 ml.) vinyl acetate was added over a five minute period. The purpose of this addition was to remove any residual dioctyl maleate in the system. Once the polymerization was complete, the contents of the vessel were cooled to 30° C. and removed from the reactor. The resulting product was then adjusted with a 14% aqueous ammonium hydroxide solution to raise the pH from a level of about 3–4.2 to a range between 5.5 and 6.5.

The resulting polymer was measured for percent insolubles by measuring solubility in toluene at a reflux temperature at atmospheric pressure. It had percent insoluble of 48%. The Tg was about −22° C.

EXAMPLE 2

The general polymerization procedure of Example 1 was repeated except 1 gal. and 15 gal. reactors were used and various amounts of monomer, surfactants (types and levels) were utilized during the runs. For convenience the polyfunctional unsaturated monomer was not included as a monomer for purposes of calculating percentages, hence its level is based on 100 weight parts of the other monomers. Tables 1 and 2 provide a summary of the variables in the reaction system.

In the tables DOM refers to dioctyl maleate, TAC refers to triallyl cyanurate, AA refers to acrylic acid, PVOH refers to polyvinyl alcohol of 87–89% hydrolysis, and VAC refers to vinyl acetate. The Igepal surfactants used were CO 630, which is a polyoxyethylene nonyl-phenyl ether having a cloud point between 126° and 135° F., and CO 887, which is a similar ether but having a cloud point above 212° F. The surfactants were used in a conventional weight ratio of 887/630 of about 1/1.47. The weight ratio of Surfynol 485/465 was 1/2.10 on an active basis.

The adhesive evaluations were carried out using 3 mil Mylar film using Pressure Sensitive Tape Council (PSTC) methods. Those test methods were: peel strength PSTC 1 in pounds/linear inch, 178 degree shear/adhesion PSTC-7 using a 500 gram weight and a ½ inch by ½ inch contact area and loop tack in pounds/linear inch.

Tack was measured on a 1 inch by 5 inch strip of Mylar film coated with the test adhesive sample. The strip is formed into a loop and the ends clamped into the upper jaw of a tensile tester. The lower jaw is fitted with a stainless steel plate or panel. The panel is raised until it contacts 1 square inch of exposed strip surface. It is lowered and the separation force measured in pounds.

TABLE 1

| Run | VAC/% | Ester/% | Polyfunctional Monomer/Parts | Monomer/% | Surfactant | PVOH | T °C. | Agitation, rpm |
|---|---|---|---|---|---|---|---|---|
| 1 | 37 | DOM/63 | — | — | Igepal/2.0[1] | 3.0 | 65 | 600 |
| 2 | 37 | DOM/63 | TAC/0.18 | — | 2.0 | 3.0 | 65 | 600 |
| 3 | 37 | DOM/63 | TAC/0.18 | — | 2.0 | 3.0 | 65 | 600 |
| 4 | 37 | DOM/63 | TAC/0.18$^B$ | — | 2.0 | 3.0 | 65 | 600 |
| 5 | 37 | DOM/63 | TAC/0.20 | — | 2.0 | 3.0 | 65 | 600 |
| 6 | 37 | DOM/63 | TAC/0.22 | — | 2.0 | 3.0 | 65 | 600 |
| 7 | 37 | DOM/63 | TAC/0.24 | — | 2.0 | 3.0 | 65 | 600 |
| 8 | 36.5 | DOM/62.5 | TAC/0.18 | AA/1.0 | 2.0 | 3.0 | 65 | 600 |
| 9 | 36.5 | DOM/62.5 | TAC/0.20 | AA/1.0 | 2.0 | 3.0 | 65 | 600 |
| 10 | 36 | DOM/62 | TAC/0.18 | AA/2.0 | 2.0 | 3.0 | 65 | 600 |
| 11 | 36.5 | DOM/62.5 | TAC/0.2 | AA/1.0 | Surfynol/2.0[2] | 3.0 | 65 | 600 |
| 12 | 36.5 | DOM/62.5 | TAC/0.2 | AA/1.0 | Igepal/2.0 | 3.0 | 65 | 800 |
| 13 | 36.5 | DOM/62.5 | TAC/0.2 | AA/1.0 | 2.0 | 3.0 | 65 | 800 |
| 14 | 36.5 | DOM/62.5 | TAC/0.2 | AA/1.0 | 2.0 | 3.0 | 65 | 800 |
| 15 | 36.5 | DOM/62.5 | TAC/0.2 | AA/1.0 | 2.0 | 3.0 | 55 | 800 |

| Run | VAC/% | Ester/% | Polyfunctional Monomer/% | Monomer/% | Surfactant | PVOH/% | T °C. | Agitation, rpm |
|---|---|---|---|---|---|---|---|---|

TABLE 1-continued

| | | | | | | | | |
|---|---|---|---|---|---|---|---|---|
| 16 | 36.75 | DOM/62.5 | TAC/0.22 | AA/1.0 | 2.0 | 3.0 | 55 | 800 |
| 17 | 36.75 | DOM/62.5 | TAC/0.24 | AA/1.0 | 2.0 | 3.0 | 55 | 800 |
| 18 | 36.75 | DOM/62.5 | TAC/0.26 | AA/1.0 | 2.0 | 3.0 | 55 | 800 |
| 19 | 36.75 | DOM/62.5 | TAC/0.28 | AA/1.0 | 2.0 | 3.0 | 55 | 800 |
| 20 | 36.75 | DOM/62.5 | TAC/0.2 | AA/1.0 | 2.0[2] | 3.0 | 65 | 800 |
| 21 | 36.75 | DOM/62.5 | TAC/0.2 | AA/1.0 | 2.0[2] | 3.0 | 55 | 800 |
| 22 | 36.75 | DOM/62.5 | TAC/0.24 | AA/1.0 | 2.0[2] | 3.0 | 55 | 800 |
| 23 | 36.75 | DOM/62.5 | TAC/0.28 | AA/1.0 | 2.0[2] | 3.0 | 55 | 800 |
| 24 | 36.75 | DOM/62.75 | TAC/0.25 | AA/0.5 | 3.0[2] | 2.0 | 55 | 800 |
| 25 | 36.5 | DOM/62.5 | TAC/0 | AA/1.0 | 3.0[2] | 2.0 | 55 | 800 |
| 26 | 36.5 | DOM/62.5 | TAC/0.25 | AA/1.0 | 3.0[2] | 2.0 | 65 | 800 |
| 27 | 37 | DOM/63 | TAC/0.25 | AA/0 | 3.0[2] | 2.0 | 55 | 800 |
| 28 | 36.5 | DOM/62.5 | TAC/0.32 | AA/1.0 | 3.0[2] | 2.0 | 55 | 220[3] |
| 29 | 36.5 | DOM/62.5 | TAC/0.30 | AA/1.0 | 3.0[2] | 2.0 | 55 | 220[3] |
| 30 | 36.5 | DOM/62.5 | TAC/0.30 | AA/1.0 | 3.0[2] | 2.0 | 55 | 220[3] |
| 31 | 36.5 | DOM/62.5 | TAC/0.30 | AA/1.0 | 3.0[2] | 2.0 | 55 | 220[3] |
| 32 | 43 | DOM/57 | TAC/0.14 | — | 3.0[2] | 2.0 | 55 | 800 |
| 33 | U CAR 173 | | | | | | | |
| 34 | Covinax 296 | | | | | | | |
| 35 | Rhoplex LC-67 | | | | | | | |
| 36 | Hycar 2600X207 | | | | | | | |

[1] Igepal C0887 and C0630 weight ratio 1:1.47 - Runs 1-10 and 12-19
[2] Surfynol 485 and 465 weight ratio of 1:2.10
[B] Batch run as opposed to delay addition
[3] 15 gallon reactor

TABLE 2

| | | Adhesive Performance | | |
|---|---|---|---|---|
| Run | % INS | Shear/min | Peel | Tack |
| 1 | 0 | 5 | 8.7 | 10.0 |
| 2 | 48 | 1,390 | 4.3 | 5.1 |
| 3 | 53 | 1,352 | 4.8 | 4.4 |
| 4 | 57 | 1,547 | 3.8 | 4.2 |
| 5 | 60 | 1,593 | 3.7 | 4.2 |
| 6 | 56 | 1,367 | 4.6 | 7.2 |
| 7 | 59 | 1,298 | 4.3 | 4.4 |
| 8 | 53 | 3,137 | 6.1 | 9.1 |
| 9 | 55 | 4,200 | 4.5 | 4.3 |
| 10 | 57 | 5,174 | 5.5 | 5.8 |
| 11 | 59 | 13,438 | 4.6 | 7.2 |
| 12 | 54 | 4,820 | 4.4 | 7.6 |
| 13 | 50 | 3,050 | 5.2 | 8.7 |
| 14 | 43 | 2,150 | 5.1 | 8.4 |
| 15 | 44 | 2,090 | 5.0 | 7.7 |
| 16 | 44 | 2,270 | 5.6 | 8.1 |
| 17 | 48 | 2,440 | 5.1 | 8.8 |
| 18 | 50 | 2,571 | 5.0 | 7.9 |
| 19 | 55 | 6,563 | 4.7 | 8.0 |
| 20 | 42 | 2,230 | 5.0 | 7.9 |
| 21 | 47 | 5,295 | 5.2 | 7.2 |
| 22 | 57 | 25,000 | 5.3 | 7.1 |
| 23 | 53 | 25,000 | 5.3 | 6.0 |
| 24 | 46 | 3,273 | 5.1 | 7.1 |
| 25 | 0 | 7 | 9.0 | 11.5 |
| 26 | 47 | 6,821 | 5.1 | 8.0 |
| 27 | 44 | 1,200 | 5.7 | 7.0 |
| 28 | 43 | 5,183 | 5.9 | 6.8 |
| 29 | 41 | 3,546 | 5.4 | 7.4 |
| 30 | 43 | 2,378 | 5.0 | 7.1 |
| 31 | 46 | 6,948 | 5.1 | 7.3 |
| 32 | 50 | 2,281 | 2.9 | 3.1 |
| 33 | U CAR 173 | 610 | 2.9 | 3.2 |
| 34 | Covinox 296 | 1,920 | 3.7 | 4.0 |
| 35 | Rhoplex LC-67 | 1,240 | 2.4 | 2.4 |
| 36 | Hycar 2600X207 | 1,740 | 2.4 | 3.1 |

On view of Tables 1 and 2, a number of features of the pressure sensitive adhesives tested can be seen. For example, in Runs 1-7, even though they were prepared with a nonionic surfactant, it is shown that by increasing the amount of polyfunctional unsaturated monomer, namely, triallyl cyanurate in the polymer system, there is a corresponding increase in percent insolubles and shear adhesion. Even though shear adhesion was low, peel and tack strengths were reasonable, e.g. generally in the neighborhood of 4 lbs. per inch, which is acceptable for commercial systems. However, shear adhesion was extremely low and below the desired objective about 6,000 minutes. Runs 8-10 show that shear adhesion can be increased by including acrylic acid into the system, and that quick tack and peel strengths can also be increased vis-a-vis a nonacid containing system, e.g. Runs 1-7. Run 11 is a system comparative to Run 9 except that a mixture of Surfynols was used as a stabilizer system component rather than the Igepal mixture. The test results show that percent insolubles and shear resistance were increased significantly. In addition, quick tack was increased. In Runs 12-19 the Igepal surfactant system was used as a component for the stabilizer system and again, pressure sensitive adhesives having low shear adhesion resulted. It was only at extremely high levels of triallyl cyanurate that shear adhesion was acceptable, but peel strengths decreased with the increase in triallyl cyanurate level. In Runs 20-24, the Surfynol mixture was used as a component of the stabilizer, and the runs show the effect of increasing the triallyl cyanurate in the system. Runs 22 and 23 show particularly good systems which have shear adhesion greater than 25,000 minutes while retaining good peel and quick tack properties.

Run 32 illustrates a pressure sensitive adhesive having increased vinyl acetate content as compared to other runs. Even though no acrylic acid was present in the system, the increased vinyl acetate concentration clearly reduces peel and tack strength. Although there is a higher shear adhesion strength vis-a-vis the systems containing acrylic acid, e.g., Runs 8-10, the decrease in peel and quick tack negate its advantage in shear adhesion. It is expected that one could vary the concentration of triallyl cyanurate and acrylic acid or employ a softer monomer that dioctyl maleate to achieve the higher peel and tack strengths, but no significant reasons for making these modifications were generated.

Runs 33-36 provide test results for commercial acrylate-type pressure sensitive adhesives. As can be gleaned from the test data, Runs 11, 22, 23, 26, 28 and 31, which illustrate preferred examples within the scope of the invention show that the present adhesive systems exceed the peel quick tack and shear adhesion performance of many commercial pressure sensitive adhesive systems.

What is claimed is:

1. A pressure sensitive adhesive polymer having excellent tack, peel and shear adhesion strength comprising by weight 34.4–40% vinyl acetate, 56.6–65% of a $C_{8-12}$ diester of an alpha, beta-unsaturated dicarboxylic acid, 0.5 to 3.0% of unsaturated acid and 0.1 to 0.4% of a polyfunctional allylic monomer, said polymer being formed from an emulsion polymerization recipe comprising water, partially hydrolyzed polyvinyl alcohol and ethoxylated acetylenic glycol of the formula:

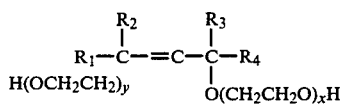

in which $R_1$ and $R_4$ are alkyl radicals containing from 3–10 carbon atoms, $R_2$ and $R_3$ are selected from the group consisting of methyl and ethyl, and x and y have a sum in the range of 3–60, inclusive and a catalyst, at a temperature sufficient to effect polymerization of the monomers, said polymer having a percent insolubles in toluene at reflux temperature and atmospheric pressure from 45–65% by weight.

2. The pressure sensitive adhesive of claim 1 wherein said diester is dioctyl maleate.

3. The pressure sensitive adhesive of claim 2 wherein said polyfunctional allylic monomer is triallyl cyanurate.

4. The pressure sensitive adhesive of claim 3 wherein said unsaturated acid is acrylic acid.

5. The pressure sensitive adhesive of claims 1, 2, 3 or 4 where the proportion of polyvinyl alcohol is from 1.5–3.5% by weight of the monomers and the ethoxylated acetylenic glycol is present in a proportion of 1.5–3.5% by weight.

* * * * *